United States Patent
Hadley et al.

(10) Patent No.: US 8,859,694 B2
(45) Date of Patent: Oct. 14, 2014

(54) CURE ACCELERATORS

(75) Inventors: Philip C. Hadley, Ely (GB); Michelle M. Irons, Soham (GB); John Cawse, West Wratting (GB)

(73) Assignee: Hexcel Composites Limited, Duxford (GB)

( * ) Notice: Subject to any disclaimer, the term of this patent is extended or adjusted under 35 U.S.C. 154(b) by 0 days.

(21) Appl. No.: 12/834,206

(22) Filed: Jul. 12, 2010

(65) Prior Publication Data

US 2011/0067812 A1    Mar. 24, 2011

Related U.S. Application Data

(62) Division of application No. 11/138,162, filed on May 26, 2005, now Pat. No. 7,781,542.

(30) Foreign Application Priority Data

Jun. 2, 2004 (GB) .................................. 0412196.8

(51) Int. Cl.
  *C08G 59/14* (2006.01)
  *C08L 63/00* (2006.01)
  *C09J 163/00* (2006.01)
  *C08G 59/68* (2006.01)

(52) U.S. Cl.
  CPC ................ *C08G 59/686* (2013.01)
  USPC .......................... 525/523; 156/330

(58) Field of Classification Search
  CPC .................................................. C08G 59/686
  USPC ........................................................ 525/529
  See application file for complete search history.

(56) References Cited

U.S. PATENT DOCUMENTS

| | | | |
|---|---|---|---|
| 3,591,556 A * | 7/1971 | Godfrey et al. | 528/109 |
| 4,618,526 A * | 10/1986 | Berman et al. | 428/209 |
| 4,756,954 A * | 7/1988 | Berman et al. | 442/85 |
| 4,931,528 A * | 6/1990 | Waddill et al. | 528/94 |
| 6,107,437 A * | 8/2000 | Cawse et al. | 528/94 |
| 6,274,682 B1 * | 8/2001 | Corley et al. | 525/533 |
| 6,555,602 B1 | 4/2003 | Harada et al. | |
| 7,786,224 B2 | 8/2010 | Takai | |
| 2002/0025431 A1 * | 2/2002 | Sawamura et al. | 428/343 |
| 2003/0069333 A1 * | 4/2003 | Date et al. | 523/211 |

* cited by examiner

*Primary Examiner* — Peter F Godenschwager
*Assistant Examiner* — David Karst
(74) *Attorney, Agent, or Firm* — W. Mark Bielawski; David J. Oldenkamp

(57) ABSTRACT

An epoxy resin composition comprising an epoxy resin component combined with a sufficient amount of an imidazole curative to provide curing of the epoxy resin composition. The epoxy resin composition further includes a non-hydroxyl containing cure accelerator for the imidazole curative.

13 Claims, 1 Drawing Sheet

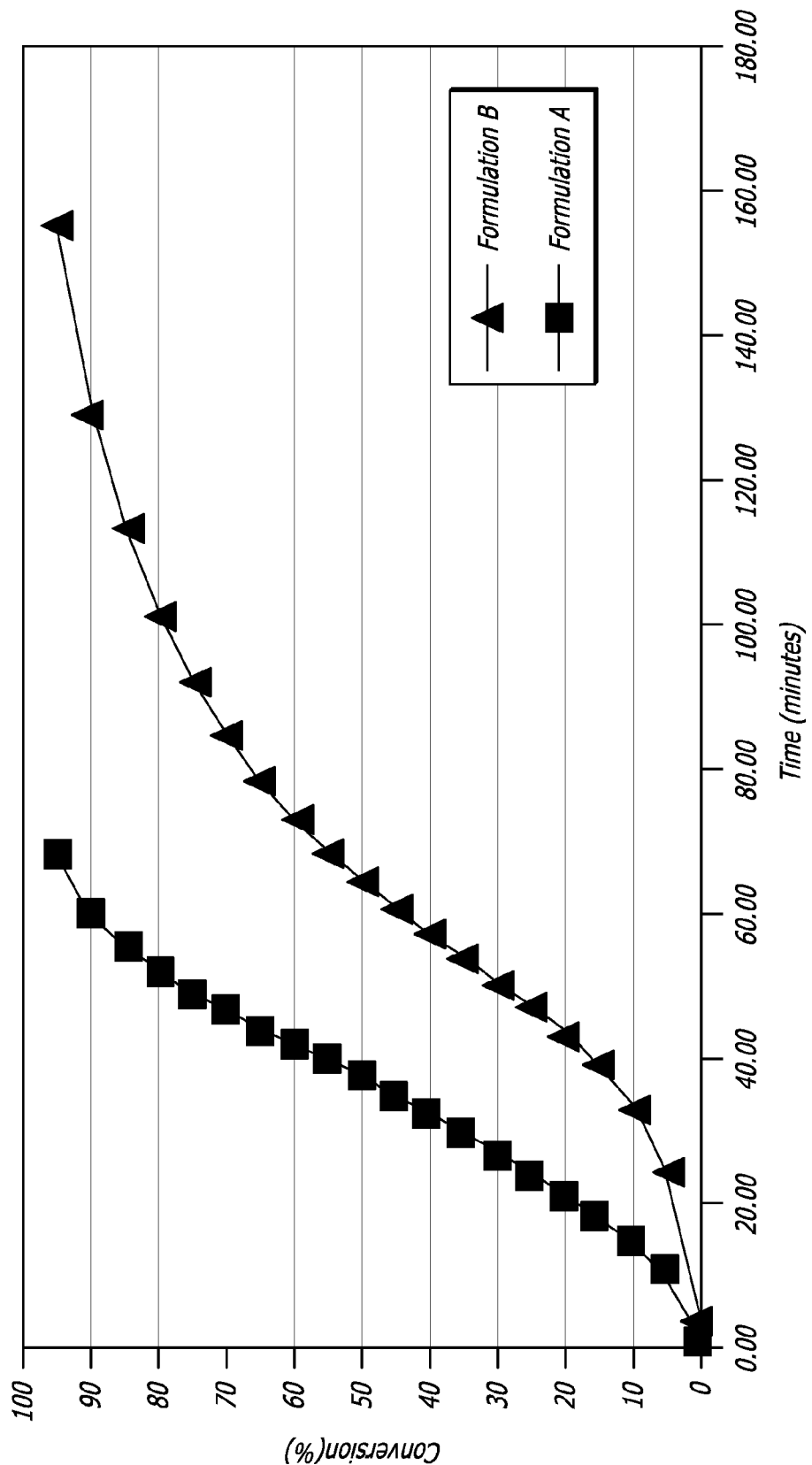

CURE ACCELERATORS

This application is a divisional of co-pending U.S. patent application Ser. No. 11/138,162, which was filed on May 26, 2005.

BACKGROUND OF THE INVENTION

1. Field of the Invention

The present invention relates to cure accelerators suitable for use in accelerating the cure of epoxy resins, in particular, to the acceleration of the imidazole cure of epoxy resins.

2. Description of Related Art

Epoxy resins are widely used as matrices for fiber-reinforced composite materials. These assemblies are widely used as structural components, in industrial and leisure applications, in aerospace and for transportation applications. Epoxy resins are also used in encapsulation formulations for the isolation and immobilization of electronic components as well as in structural adhesives.

There are a number of well-known reaction mechanisms which can be used to cure epoxy resins. One such mechanism involves the use of an agent which behaves as an initiator for the ring opening polymerization of the epoxy ring. Ring opening polymerization can be initiated by a number of compounds, common examples of which include tertiary amines and imidazoles.

Imidazoles offer significant benefits when used as epoxy resin curatives. The correct choice of imidazole enables the cure conditions to be manipulated, which can give benefits in outlife, reaction enthalpy, reaction rate, cure temperature, cost, mechanical performance and formulation viscosity etc.

For some applications it is important to have an epoxy resin system which cures rapidly at relatively low temperatures, for example 60-80° C., but that will maintain the properties referred to above. The majority of currently available imidazole-cured epoxy resin formulations fail to cure within practically useful timescales at low temperatures. Where it is possible to meet the required cure times using existing imidazole/epoxy chemistry, there are often times where a more rapid initiation of the cure reaction is of benefit. Preferably, this will be manifested as a faster gel time resulting in quicker structural immobilisation of the resin or assembly.

For some applications it is important to have an epoxy resin system which cures rapidly at relatively low temperatures, for example 60-80° C., but that will maintain the properties referred to above. The majority of currently available imidazole-cured epoxy resin formulations fail to cure within practically useful timescales at low temperatures. Where it is possible to meet the required cure times using existing imidazole/epoxy chemistry, there are often times where a more rapid initiation of the cure reaction is of benefit. Preferably, this will be manifested as a faster gel time resulting in quicker structural immobilisation of the resin or assembly.

Until recently, there have been no compounds available that can act as accelerators for the imidazole-epoxy reaction.

WO 02/081540 discloses the use of alcohols as imidazole cure accelerators in Resin Transfer Moulding (RTM) systems. However, alcohols are volatile and so their use as accelerators is unsuitable for many applications, particularly those applications where the alcohol has the opportunity to evaporate prior to or during cure.

Therefore, it is an object of the present invention to provide imidazole cure accelerators for epoxy resins which facilitate rapid low temperature cure of the resin.

SUMMARY OF THE INVENTION

According to the first aspect of the present invention there is provided an epoxy resin composition comprising at least one epoxy resin component, at least one imidazole curative and at least one non-hydroxyl containing cure accelerator for imidazoles.

Advantageously, compositions of the present invention can be used for systems where the ultimate glass transition temperature of the formulation is not commensurate with the cure temperature, i.e. the formulation is capable of higher glass transition temperatures than the cure temperature is able to confer on the system, the thermo-mechanical performance of the material appears to be enhanced for inclusion of these accelerators. This is evidenced by reference to dynamic mechanical thermal analysis (DMTA) results of cured resin plaques or laminates that show an improved modulus hold up from ambient temperature to the E' extrapolated onset Tg, and less evidence of viscous damping at temperatures exceeding the peak tan $\delta$ of the formulation. The improvement noted is related to the amount of accelerator used in the formulation and the nature of the formulation in which it features.

It has been found that the inclusion of a cure accelerator leads to compositions having a reduced gel time relative to compositions which lack a cure accelerator. This offers clear advantages in the way in which the composition of the present invention can be processed.

BRIEF DESCRIPTION OF THE DRAWING

FIG. 1 is a graph showing the degree of conversion of formulations containing cure accelerators over time expressed as a percentage of total enthalpy.

DETAILED DESCRIPTION OF THE INVENTION

As referred to herein, gelation/gel time is taken to be the time at which the uncured resin composition is no longer fluid and pulls away from the sides of the containing vessel.

Liquid and/or solid type epoxy resins may be used with the present invention. These materials have an oxirane ring that can be polymerized by ring opening and include both monomeric and polymeric types. Furthermore, they may also carry additional substituent functionality. The epoxy resin component may comprise at least one liquid and/or at least one solid type epoxy resin.

Suitable epoxy resins, which can be used alone or combination, include any of the following; aromatic glycidyl ethers, aliphatic glycidyl ethers, glycidyl amines and glycidyl esters.

Suitable aromatic glycidyl ethers, which may be used alone or in combination, include any of the following: diglycidyl ethers of bisphenol A, bisphenol F and bisphenol S; the glycidyl ethers of the novolaks obtainable from phenol, cresol, bisphenol A, halogenated phenols; the diglycidyl ether of tetrabromo bisphenol A, the diglycidyl ether of tetrabromo bisphenol S; diglycidyl ethers of resorcinol and alkylated resorcinols, the diglycidyl ether of hydroquinone, diglycidyl ether of 2,5-di-tertiary butyl hydroquinone, the tetraglycidyl ether of 1,1-methylenebis(2,7-dihydroxynaphthalene), the diglycidyl ether of 4,4'-dihydroxy-3,3',5,5'-tetramethylbiphenyl, the diglycidyl ether of 1,6-dihydroxynaphthalene, the diglycidyl ether of 9,9'-bis(4-hydroxyphenyl)fluorene, the diglycidyl ether of the reaction product of glycidol and butylated catechol, the triglycidyl ether of tris(p-hydroxyphenyl) methane, the tetraglycidyl ether of tetrakis(p-hydroxyphenyl) ethane.

Suitable aliphatic glycidyl ethers, which may be used alone or in combination include any of the following; diepoxypropane, diepoxybutane, diepoxyhexane, diepoxyoctane, the diglycidyl ether of neopentyl glycol, the diglycidyl ether of cyclohexane dimethanol, the triglycidyl ether of glycerol, the triglycidyl ether of trimethylolethane, the triglycidyl ether of trimethylolpropane, the tetraglycidylether of pentaerythritol, 3,4-epoxycyclohexylmethyl-3,4-epoxycyclohexanecarboxylate, vinyl cyclohexene dioxide, bis(2,3-epoxycyclopentyl)ether, dicyclopentanediepoxide, the diglycidyl ether of hydrogenated bisphenol A, bis(3,4-epoxycyclohexylmethyl) adipate.

Suitable glycidyl amines, which may be used alone or in combination, include any of the following: diglycidylaniline, diglycidyl o-toluidine, the tetraglycidyl derivative of diaminodiphenylmethane, tetraglycidyl derivative of 3,3'-diethyl-4,4'-diaminodiphenylmethane, the tetraglycidyl derivative of m-xylylenediamine; 1,3-bis(diglycidylaminomethyl)cyclohexane; triglycidyl-m-aminophenol and triglycidyl-p-aminophenol.

Suitable glycidyl esters, which may be used alone or in combination, include any of the following; the diglycidyl ester of phthalic acid, the diglycidylester of 1,2-cyclohexanedicarboxylic acid, the diglycidyl ester of terephthalic acid, and the diglycidylester of hexahydrophthalic acid.

Taking into account the imidazole curative, the cure accelerator and other additional ingredients as referred to herein the epoxy resin is preferably present in the composition in an amount up to 100%. Therefore, the epoxy resin typically constitutes from about 50% to about 99% by weight of the composition.

Any imidazole derived curative may be used with the present invention. Examples of particularly preferred imidazole curative are disclosed in EP 0906977 B1, the contents of which is hereby incorporated by reference.

Particularly suitable imidazole curatives, which may be used alone or in combination include any of the following; imidazole, 2-methylimidazole, 2-ethylimidazole, 2-undecylimidazole, 2-heptadecylimidazole, 2-phenylimidazole, 1,2-dimethylimidazole, 2-ethyl-4-methylimidazole, 2-phenyl-4-methylimidazole, 1-benzyl-2-phenylimidazole, 1-benzyl-2-methylimidazole, 1-cyanoethyl-2-methylimidazole, 1-aminoethyl-2-methylimidazole, and the like. The imidazole curative preferably constitutes from about 0.1% to about 30% by weight of the epoxy resin composition.

The use of latent imidazoles offers an additional advantage in that they provide some degree of room temperature outlife. As referred to herein room temperature means from about 20° C. to about 30° C.

Imidazole cure accelerators suitable for use with the present invention include sulfonamides, benzamides and/or aromatic acid hydrazides. The exact mechanism by which these materials accelerate imidazole cure is not clear, although it is believed that they may facilitate epoxy cure by modification of the solubility characteristics of the resin formulation, or by stabilization of some reactive intermediate formed during the curing mechanism.

Particularly suitable sulfonamides, which may be used alone or in combination include any of the following: N-methyl toluenesulfonamide, N-ethyl toluenesulfonamide, methanesulfonamide, benzenesulfonamide, N-butylbenzenesulfonamide, p-chlorobenzenesulfonamide, o-toluenesulfonamide, p-toluenesulfonamide, and bis(hydroxyethyl)toluenesulfonamide. Monofunctional sulfonamides, such as those listed here, are preferred. Difunctional (disulfonamides) are not preferred.

Particularly suitable benzamides, which may be used alone or in combination, include any of the following: n-methyl benzamide and n-methyl toluamide.

Particularly suitable aromatic acid hydrazides, which may be used alone or in combination include any of the following: benzoic hydrazide, p-toluic hydrazide, m-toluic hydrazide, m-anisic hydrazide, 2-chlorobenzoic hydrazide, 2-nitrobenzoic hydrazide, 2-furoic hydrazide and 1-naphthoic hydrazide. Monofunctional aromatic acid hydrazides, such as those listed here, are preferred. Difunctional aromatic acid hydrazides (dihydrazides) are not preferred.

The imidazole cure accelerator preferably constitutes from about 1% to about 20% by weight of the epoxy resin composition, more preferably from about 5% to about 15% and most preferably from about 7% to about 13%. The relative amounts of imidazole curative and imidazole cure accelerator in the epoxy resin composition are chosen such that the imidazole functions as the curative agent and the cure accelerator functions as an accelerator for the imidazole curing process.

The epoxy resin composition of the present invention may additionally comprise performance enhancement or modification agents which may be used alone or in combination. These include, but are not limited to, inorganic fillers such as silica, alumina; additional accelerators; thermoplastics and core shell rubbers; flame retardants which may be intumescents; wetting agents; pigments/dyes; UV absorbers; toughening particles; and viscosity modifiers.

According to a second aspect of the present invention there is provided a process for the manufacture of an epoxy resin composition comprising the steps of: preparing a mixture comprising an imidazole curative and at least one epoxy resin component, adding a non-hydroxyl containing imidazole cure accelerator to the mixture and curing the system by the application of heat.

Preferably, the curing of the system will also include the application of pressure. Advantageously, the present invention gives rise to a faster gelling and faster curing system upon the application of heat to the formulation. This modification allows lower cure temperatures to be considered.

Advantageously, the system of the present invention may be cured using a cure cycle of 2 hours at 80° C. It is worth noting that representative cure cycles for typical imidazole containing matrices wherein no cure accelerator is present are 12 to 16 hours at 65° C. and 4 hours at 80° C. Clearly, the system of the present invention offers a more efficient process.

It is envisaged that the epoxy resin system of the present invention will find utility in one or multi-component systems for Resin Transfer Moulding (RTM), Vacuum-assisted Resin Transfer Moulding (VaRTM), Liquid Resin Infusion (LRI) and the like. In a still further alternative the resin composition may be such that it has adhesive properties. Such adhesives may be in the form of a film, a paste, a powder or a liquid. When in the form of a paste, the adhesives can be delivered conventionally or using cartridge delivery. The epoxy resin system may be used for component encapsulation and as the matrix resin in fiber reinforced resin assemblies including prepregs, which are used in forming such assemblies. When making a prepreg, the matrix resin composition may be applied to the fibrous web in such a way as to either fully or partially impregnate the fibers. Alternatively, the resin composition may be in a form of a separate layer that is in contact with the fibers but does not impregnate the fibers until the prepreg is cured. These are by way of examples and do not limit the application of this invention.

Thus, according to a further aspect of the present invention there is provided an epoxy resin adhesive comprising at least one epoxy resin component together with at least one imidazole curative and at least one non-hydroxy containing cure accelerator for imidazoles. Sulfonamides, benzamides and aromatic acid hydrazides are examples of suitable non-hydroxy containing cure accelerators. Other known imidazole curatives may be used in accordance with the present invention provided that they do not contain a hydroxy group.

When in the form of an adhesive, the resin composition may be in the form of a thin film. Alternatively, the composition may be in the form of a one or two component paste, which may be delivered in a number of ways including from a pot, from a mechanized, powered delivery pump, and via a cartridge system. The epoxy resin, imidazole curative and imidazole cure accelerator of the resin composition are as hereinbefore described.

The invention will now be described by way of example only with reference to the following examples. All the mixing was done by hand at room temperature and continued until a homogeneous mix was obtained.

Example 1

1.0 g of 1-(1-imidazolyl)-2-hydroxyoctadecane, Curative I, a latent imidazole curative which is the subject of EP 0906927 B1 was added to 8.0 g of Epikote 828 a diglycidyl ether of bisphenol-A supplied by Resolution Resins, Rotterdam, Holland, 1.0 g of a specified imidazole curing accelerator was added to the mixture to provide a test sample. All of the accelerators were obtained from Aldrich Chemical Company, Gillingham, UK. Each test sample was subjected to gel time experiments that were performed at 80° C. in a thermostated oil bath on 10 g of the test sample referred to above. The gel time was determined manually to be the time when the liquid test sample became elastic.

A control sample (the chosen imidazole plus resin, with no added accelerator) was run along with each set of test samples. The gel times were normalised within each set by dividing the accelerated gel time by the control gel time.

A second series of gel experiments were conducted whereby Curative I was substituted by 0.50 g 2-phenylimidazole (Aldrich Chemical Company, Gillingham, UK), and 0.94 g of the imidazole cure accelerator were added. The results of both experiments are shown in Table 1 below. The concentration for each imidazole in the control, i.e. without accelerator, was selected so as to result in a gel time for the control system of 25 to 30 minutes.

TABLE 1

| Cure Accelerator | Gel time relative to control | |
|---|---|---|
| | Curative I | 2-phenyl imidazole |
| None (Control) | 1 | 1 |
| N-methyl toluenesulfonamide | 0.56 | 0.79 |
| Methanesulfonamide | 0.61 | |
| N-ethyl toluenesulfonamide | 0.67 | 0.88 |
| N-Butylbenzenesulfonamide | 0.67 | |
| Benzenesulfonamide | 0.65 | 1.08 |
| p-chlorobenzenesulfonamide | 0.54 | 0.96 |
| o-toluenesulfonamide | 0.69 | |
| p-toluenesulfonamide | 0.58 | 0.92 |
| Bis(hydroxyethyl)toluenesulfonamide | 0.81 | |
| Naphthosultam | 0.89 | |
| Ethylenebisstearamide | 1.04 | |
| Valerolactam | 1 | |
| Laurolactam | 0.96 | |

Table 1 shows that most of the sulfonamides tested gave some degree of cure acceleration. However, as can be observed from the last 3 examples in the table, simple amides did not accelerate the cure of the resin.

Example 2

1.0 g of Curative I was added to 8.0 g of Epikote 828. 1.0 g of a specified imidazole cure accelerator was added to the mixture to provide test samples.

The test samples were subjected to the gel experiments described above. The results are shown in table 2.

TABLE 2

| Cure Accelerator | Gel Time Relative to Control |
|---|---|
| Benzoic hydrazide | 0.38 |
| p-Toluic hydrazide | 0.42 |
| m-Toluic hydrazide | 0.40 |
| m-Anisic hydrazide | 0.40 |
| 2-Chlorobenzoic hydrazide | 0.41 |
| 2-Nitrobenzoic hydrazide | 0.39 |
| 2-Furoic hydrazide | 0.39 |
| 1-Naphthoic hydrazide | 0.45 |
| N-Methylbenzamide | 0.83 |
| N-Methyltoluamide | 0.82 |

It can be seen that lower molar mass hydrazides have a more marked effect upon the acceleration of the cure than either the benzamides or the sulfonamides.

Example 3

Differential Scanning Calorimetry (DSC) studies were carried out to examine the rate of conversion of formulations containing cure accelerators. By way of example, the following formulations were subjected to both dynamic and isothermal DSC studies. LY1556 is an epoxy resin available from Huntsman Advanced Materials, Duxford, England

TABLE 3

| Additive | Formulation A | Formulation B |
|---|---|---|
| LY1556 | 8.43 g | 9.7 g |
| 2-phenylimidazole | 0.30 g | 0.3 g |
| N-ethyltoluenesulfonamide (ETS) | 1.27 g | — |

A Mettler Toledo Differential Scanning Calorimeter (DSC), model DSC822E, was used to measure the total reaction enthalpy from each of the formulations. The evaluations were carried out in dynamic mode from −35° C. to +250° C. at 20° C. per minute heat up rate. Formulation A was found to have a total reaction enthalpy of 360 J/g, whilst formulation B was found to have a reaction enthalpy of 310 J/g despite having 15% more resin present. While not wishing to be bound by this theory, this could indicate that perhaps the accelerator is facilitating a greater degree of reaction. Taking these enthalpy data as a measure of total possible reaction, isothermal DSC runs were carried out at a typical cure temperature of 80° C.

Example 4

By way of another example and to further illustrate the efficacy of the accelerator, dynamic DSC analyses were conducted on the formulations shown in Table 4.

TABLE 4

| Additive | Formulation C | Formulation D | Formulation E | Formulation F |
|---|---|---|---|---|
| LY1556 | 9.0 g | 7.73 g | 8.73 g | — |
| Curative I | 1.0 g | 1.0 g | — | 5.0 g |
| ETS | — | 1.27 g | 1.27 g | 5.0 g |

Formulations E and F showed no evidence of any reaction (no endothermic or exothermic changes attributable to chemical reaction). This shows that (a) the accelerator does not have the potential to cure the epoxy resin alone under these conditions and that (b) there is no discernible reaction of Curative I with the accelerator. Formulation F does show an endotherm attributable to a melting event (comprising melting of both the curative and accelerator). Formulation E does not show any discernible melting event as the accelerator is totally in solution in the resin.

The dynamic DSC analysis of Formulation C shows a melting endotherm corresponding to fusion of Curative I followed by a curing exotherm. The onset of this exotherm is at 120° C. and it peaks at 146° C. The total energy release is of the order of about 400 J/g and the reaction profile does not appear to be complete before 210° C. The DSC reports a similar melting transition for Formulation D. The onset of reaction is some 20° C. lower than formulation A and the reaction profile is of a different shape. The main peak of this exotherm appears at 137° C., and the total energy release this time is of the order of 450 J/g, despite there being a lower epoxy content for reaction in this mixture. The reaction profile is narrower than formulation C, with all measurable cure being complete by 190° C. on this dynamic analysis.

The invention will now be described further by way of example only with reference to FIG. 1, which is a graph showing the degree of conversion of formulations containing cure accelerators over time expressed as a percentage of total enthalpy.

FIG. 1 shows that the reaction proceeds markedly faster with the accelerator present than without, reaching 95% conversion in less than half the time it takes for the non-accelerated sample to reach this point. The increased reaction rate is evident from the outset of the experiment, but is also evident in the latter stages of reaction (>60% conversion) where rate continues to be high instead of tailing off as in the non-accelerated formulation.

It is of course to be understood that the above-described examples are by way of illustration only. Many modifications and variations are possible.

What is claimed is:

1. A process for the manufacture of a cured epoxy resin composition comprising the steps of:
   a) providing a mixture consisting of an epoxy resin component, a curative component and an accelerator for said curative component wherein said curative component consists of a sufficient amount of an imidazole curative to provide imidazole curing of said epoxy resin composition at a temperature of 60° C.-80° C. wherein said imidazole curative reacts with said epoxy resin component during curing thereof, said accelerator for said curative component consisting of a sulfonamide that accelerates said imidazole curing at said temperature of 60° C.-80° C., said sulfonamide being selected from the group consisting of N-methyl toluenesulfonamide, N-ethyl toluenesulfonanmide, methanesulfonamide, benzenesulfonamide, N-butylbenzenesulfonamide, p-chlorobenzenesulfonamide, o-toluenesulfonamide, p-toluenesulfonamide, bis(hydroxyethyl)-toluenesulfonamide and combinations thereof and wherein said imidazole curative consists of a latent imidazole curative having the formula

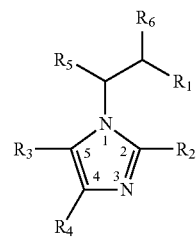

wherein $R_1$ is $C_6$ to $C_{24}$ saturated or unsaturated straight or branched chain alkyl or cycloaliphatic group or may with $R_5$ form a ring; $R_2$ is $H_1$, $C_1$ to $C_{18}$ alkyl, aryl or substituted aryl; $R_3$ and $R_4$ are the same or different and are $H_1$, $C_1$-$C_3$ alkyl, aryl or substituted aryl, —$CH_2OH$, —CN, —Cl or together may form a ring; $R_5$ is H or together with $R_1$ forms a non-aromatic ring; $R_6$ is OH; and
   b) imidazole curing said mixture with said imidazole curative at said temperature of 60° C.-80° C. wherein said imidazole curing is accelerated by said sulfonamide.

2. A process for the manufacture of a cured epoxy resin composition according to claim 1 wherein said epoxy resin component comprises an epoxy resin selected from the group consisting of aromatic glycidyl ethers, aliphatic glycidyl ethers, glycidyl amines, glycidyl esters and combinations thereof.

3. A process for the manufacture of a cured epoxy resin composition according to claim 1 wherein the weight ratio of said imidazole curative to said imidazole cure accelerator is about 1:1.

4. A process for the manufacture of a cured epoxy resin composition according to claim 1 wherein the amount of said imidazole curing agent in said mixture is equal to 0.1% to 30% by weight of said mixture.

5. A process for the manufacture of a cured epoxy resin composition according to claim 4 wherein the amount of said imidazole cure accelerator in said mixture is equal to 1.0% to 20% by weight of said mixture.

6. A process for the manufacture of a cured epoxy resin composition according to claim 5 wherein the amount of said imidazole curing agent in said mixture is equal to 10% by weight of said mixture.

7. A process for the manufacture of a cured epoxy resin composition according to claim 1 wherein said latent imidazole curative is 1-(1-imidazolyl)-2-hydroxyoctadecane.

8. A method for bonding two objects together, said method comprising the steps of:
   a) applying an epoxy resin composition to one or both of said objects, said epoxy resin composition comprising a mixture consisting of an epoxy resin component, a curative component and an accelerator for said curative component wherein said curative component consists of a sufficient amount of an imidazole curative to provide imidazole curing of said epoxy resin composition at a temperature of 60° C.-80° C. wherein said imidazole curative reacts with said epoxy resin component during curing thereof said accelerator for said curative component consisting of a sulfonamide that accelerates said imidazole curing at said temperature of 60° C.-80° C., said sulfonamide being selected from the group consisting of N-methyl toluenesulfonamide, N-ethyl toluenesulfonamide, methanesulfonamide, benzenesulfonamide, N-butylbenzenesulfonamide, p-chlorobenzenesulfonamide, o-toluenesulfonamide, p-toluenesulfonamide, bis(hydroxyethyl)-toluenesulfonamide and combinations thereof and wherein said imidazole curative consists of a latent imidazole curative having the formula

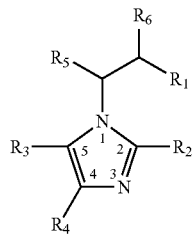

wherein $R_1$ is $C_6$ to $C_{24}$ saturated or unsaturated straight or branched chain alkyl or cycloaliphatic group or may with $R_5$ form a ring; $R_2$ is $H_1$, $C_1$ to $C_{18}$ alkyl, aryl or substituted aryl; $R_3$ and $R_4$ are the same or different and are H, $C_1$-$C_3$ alkyl, aryl or substituted aryl, —$CH_2OH$, —CN, —Cl or together may form a ring; $R_5$ is H or together with $R_1$ forms a non-aromatic ring; $R_6$ is OH; and b) bonding said objects together by imidazole curing said epoxy resin composition with said imidazole curative at said temperature of 60° C.-80° C. wherein said imidazole curing is accelerated by said sulfonamide.

9. A method for bonding two objects together according to claim 8, wherein said epoxy resin component comprises an epoxy resin selected from the group consisting of aromatic glycidyl ethers, aliphatic glycidyl ethers, glycidyl amines, glycidyl esters and combinations thereof.

10. A method for bonding two objects together according to claim 8 wherein the weight ratio of said imidazole curative to said imidazole cure accelerator is about 1:1.

11. A method for bonding two objects together according to claim 8 wherein the amount of said imidazole curing agent in said mixture is equal to 0.1% to 30% by weight of said mixture.

12. A method for bonding two objects together according to claim 11 wherein the amount of said imidazole cure accelerator in said mixture is equal to 1.0% to 20% by weight of said mixture.

13. A method for bonding two objects together according to claim 12 wherein the amount of said imidazole curing agent in said mixture is equal to 10% by weight of said mixture.

* * * * *